United States Patent Office 2,765,309
Patented Oct. 2, 1956

2,765,309

WATER-SOLUBLE SULFOCHLORO-ACETIC ESTER SALTS OF LEUCO VAT DYESTUFFS AND PROCESS OF PREPARING THE SAME

Wilhelm Eckert and Rudolf Kühne, Frankfurt am Main, Germany, assignors to Farbwerke Hoechst Aktiengesellschaft vormals Meister Lucius & Brüning, Frankfurt am Main-Hochst, Germany, a company of the Federal Republic of Germany No Drawing. Application April 27, 1953,
Serial No. 351,514

Claims priority, application Germany April 30, 1952

6 Claims. (Cl. 260—272)

The present invention relates to water-soluble sulfochloro-acetic ester salts of leuco vat dyestuffs and to a process of preparing the same; more particularly it relates to dyestuff derivatives corresponding to the following general composition:

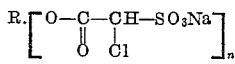

wherein R represents the radical of a vat dyestuff and $n$ means a number which is at least 2.

The sulfuric ester salts of leuco vat dyestuffs have a considerable practical importance in the textile dyeing and printing industry on account of the great advantages of their application and they are on the market under most different trade names. They correspond to the following general formula

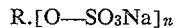

wherein R represents the radical of a vat dyestuff and $n$ means a number which is at least 2.

Their manufacture is mainly based on the process described in German Patent No. 424,981 according to which the compounds are obtained by treating the leuco-compounds of vat dyestuffs with chlorosulfonic acid in the presence of a tertiary base and converting the compounds so obtained into stable salts. According to the process described in German Patent No. 567,081 the sulfuric esters of leuco vat dyestuffs can also be prepared in a more simple manner by simultaneously reducing and esterifying the vat dyestuff in the presence of a metal, such as copper, zinc, or the like. The same compounds are obtained by exchanging the pyridines used as tertiary bases, for an organic acid amide derived from a secondary amine, such as, for example, dimethyl- or diethylformamide (Swiss Patent No. 257,723).

The esterification method can be further simplified by the process described in British Patent No. 585,106 which enables the leuco sulfuric esters to be prepared in an aqueous alkaline medium wherein as acylating agents the addition compounds of sulfur trioxide and a strong, tertiary amine are used, such as trimethylamine or triethylamine, N-ethylmorpholine, and others.

The sulfuric ester salts of leuco vat dyestuffs are in an aqueous solution stable to dilute alkalies, but they are split up by means of dilute acids and reconverted into the parent vat dyestuffs in the presence of an oxidizing agent. The practical application of the salts is based on these properties.

Now, we have found that new, water-soluble derivatives of leuco vat dyestuffs which, according to their chemical composition, are sulfochloro-acetic ester salts, can be obtained by causing the leuco compounds of vat dyestuffs to react with halides of sulfochloro-acetic acid in the presence of a tertiary base and converting the compounds so obtained into stable, water-soluble salts.

The sulfochloro-acetic ester salts are water-soluble like the corresponding sulfuric ester salts, but they show reverse properties of stability, when the pH-value of the solution is changed. The new compounds are, therefore, stable in the pH-range of $\leq 7$, but are, however, readily split up by dilute alkalies and converted into the parent vat dyestuffs in the presence of an oxidizing agent.

Water-soluble esters of leuco vat dyestuffs capable of being split off by the action of alkalies have already been known, for example, the compounds obtainable by the processes described in German Patents Nos. 583,070 and 697,431. The acylating agents used for the manufacture of these leuco esters consist of a pyridine solution of the unilateral acid chlorides or acid anhydrides of aromatic sulfocarboxylic acids, such as, for example, ortho- or meta-sulfobenzoic acid, naphthalene-2-carboxylic acid-sulfonic acid, or the like. These esters, however, did not acquire a practical importance, not even the compounds of this series derived from meta-sulfobenzoic acid which have mostly been handled.

In addition to a very low affinity for the vegetable fiber, the meta-sulfo-benzoates have the disadvantage decisive for industrial use that they can only be split up with difficulty.

The new sulfochloro-acetic ester salts of leuco vat dyestuffs obtainable by the present invention do not show these disadvantages. They possess under comparable conditions about the same affinity for the vegetable fiber as the corresponding sulfuric ester salts and, in some cases, they even have a distinctly improved affinity. The splitting up by means of dilute alkalies occurs smoothly under mild conditions and by some grades more quickly than with the above-mentioned meta-sulfobenzoates, which constitutes a considerable advantage for the practical application.

The sulfochloro-acetic esters of leuco vat dyestuffs can be obtained according to the present invention either by reacting the leuco compound of the vat dyestuffs, advantageously prepared in a tertiary base, with the acylating agent consisting of sulfochloro-acetyl chloride in the solution of a tertiary base, or by simultaneously reducing and esterifying the vat dyestuff in the acylating mixture described in the presence of a metal, such as copper, iron or zinc. It is not necessary to use in a pure state the sulfochloro-acetic acid which, for the manufacture of the acylating agent, is caused to react in a pyridine solution with an aromatic acid halide or phosgene, but it has proved advantageous to use the crude product obtained in preparing this compound from chloro-acetic acid and sulfur trioxide.

According to the present invention various classes of vat dyestuffs can be converted into the corresponding sulfochloro-acetic ester salts of the leuco compounds, for example, the indigoid and thio-indigoid dyestuffs, the group of the dibenzo-pyrene quinones, dibenzanthrones, iso-dibenzanthrones, anthanthrones, pyranthrones, anthrimidecarbazoles, and others.

The following examples serve to illustrate the invention but they are not intended to limit it thereto; the parts being by weight unless otherwise stated and the relationship of parts by weight to parts by volume being the same as that of the kilogram to the liter.

Example 1

2 parts of benzo-2, benzo-2'-dimethoxydibenzanthrone are heated to 50° C. in a mixture of 10 parts by volume of pyridine, 1 part of iron powder and 1 part of pyridine-hydrochloride, while passing carbon dioxide through the mixture and stirring until complete reduction has taken place. The acylating mixture, obtained by reacting at 35° C.–40° C. 7 parts of crude sulfochloro-acetic acid with 7.5 parts of para-toluene-sulfochloride in 50 parts by volume of pyridine, is then added to the mixture and the whole is stirred at 50° C.–55° C. until a clear red-brown solution is obtained and a test-sample is clearly soluble in a dilute sodium carbonate solution. After a period of about 4 hours the solution is freed from the iron powder by filtering with suction and the filtrate is stirred into a cold mixture of 300 parts by volume of water and 40 parts of concentrated sulfuric acid. The red-brown precipitate which has separated is filtered with suction and washed. The pyridine can be recovered from the filtrate in the usual manner. For the conversion into the sodium salt, the reaction product is dissolved at 40° C.–50° C. in 100 parts by volume of water, while adding 0.8 part of sodium carbonate, and salted out with sodium chloride. After being dried under reduced pressure, the sodium salt is obtained in the form of a dark powder which is readily soluble in water to a clear red-brown solution. After addition of dilute alkalies to the aqueous solution of the new ester salt and in the presence of an oxidizing agent, the insoluble parent vat dyestuff separates after a short time.

The leuco sulfochloro-acetic ester corresponds to the following formula

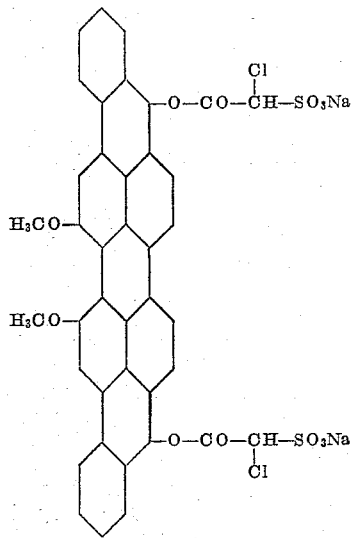

Example 2

2 parts of benzo-2, benzo-2'-dimethoxydibenzanthrone are mixed with 60 parts of pyridine. 7 parts of crude sulfo-chloroacetic acid and 7.5 parts of para-toluene-sulfo-chloride are then added at a temperature of 35° C.–40° C. After the addition of 1 part of iron powder, the whole is heated to 50° C.–55° C., while passing carbon dioxide through the mixture, and the temperature is maintained until a clear red-brown solution is obtained and a test-sample is clearly soluble in dilute sodium carbonate solution. The sodium salt of the leuco ester obtained from the reaction mixture in the same manner as described in Example 1 is identical with the product described in that example.

Example 3

By replacing the para-toluene-sulfochloride used in Example 1 by 3.6 parts of phosgene and proceeding otherwise in the same manner, the sodium salt of the sulfo-chloroacetic ester of leuco benzo-2,benzo-2'-dimethoxy-dibenzanthrone is obtained as described in Example 1.

Example 4

2.5 parts of 5.5'-7.7'-tetrabromoindigo are mixed with 60 parts by volume of pyridine, and thereupon 7 parts of crude sulfochloro-acetic acid and 7.5 parts of para-toluene-sulfochloride are stirred into the mixture at 35° C.–40° C. After the addition of 1 part of iron powder, the whole is heated to 45° C.–50° C., while passing carbon dioxide through the mixture, and this temperature is maintained until a clear solution is obtained and a test-sample of the reaction mixture is clearly soluble in water while adding a small quantity of sodium bicarbonate. After a period of about 3 hours, the mixture is freed from the iron powder by filtering with suction and the filtrate is stirred into a cold mixture of 300 parts by volume of water and 40 parts of concentrated sulfuric acid. The light-grey precipitate which has separated is filtered off with suction and washed. For the conversion into the sodium salt, the reaction product is dissolved at 30° C.–40° C. in 150 parts by volume of water, while adding 1.5 parts of sodium bicarbonate, filtered and salted out. After being dried under reduced pressure, the sodium salt is obtained in the form of a grey powder which is soluble in water and is very quickly re-converted into the blue parent vat dyestuff after the addition of dilute alkalies and in the presence of an oxidizing agent.

Example 5

5 parts of dibromo-dibenzpyrene quinone are reduced at 50° C. in 20 parts by volume of pyridine, 2 parts of iron powder and 2 parts of pyridine hydrochloride while passing carbon dioxide through the mixture. Thereupon the acylating mixture of 100 parts by volume of pyridine, 14.5 parts of crude sulfochloro-acetic acid and 15.2 parts of para-toluene sulfochloride is added. At a temperature of 45° C.–50° C. the reaction is complete after 3 hours. The iron residue is removed by filtering and the filtrate so obtained is stirred into a cold mixture of 600 parts by volume of water and 80 parts of concentrated sulfuric acid. The orange-yellow precipitate which has separated is filtered off with suction and washed. For the conversion into the sodium salt, the product is dissolved at 40° C.–50° C. in 300 parts by volume of water with addition of 2 parts of sodium carbonate, filtered and salted out. The yellow-brown powder obtained after drying the sodium salt under reduced pressure is clearly soluble in water. After the addition of dilute alkalies and an oxidizing agent to the aqueous solution, the insoluble parent vat dyestuff is recovered after a short time.

Example 6

2 parts of 4.4'-dimethyl-6-6'-dichloro-thioindigo are reduced as described in Example 1. The acylating mixture, obtained by reacting at 35° C.–40° C. 7 parts of crude sulfo-chloro-acetic acid with 7.5 parts of para-toluene-sulfochloride in 50 parts by volume of pyridine, is then added to the mixture and the whole is stirred at 50° C. until a clear solution is obtained and a test-sample is clearly soluble in dilute sodium carbonate solution. After a period of about 4 hours the mixture is worked up as described in Example 1. The sodium salt is obtained in the form of a light-yellow, water-soluble powder. From the aqueous solution of the ester salt the insoluble parent vat dyestuff separates again after a short time on addition of dilute alkalies and in the presence of an oxidizing agent.

Example 7

2.3 parts of the leuco compound of 5.5'-dichloro-7.7'-dimethyl-thioindigo are stirred at 48° C.–52° C. in the acylating mixture obtained by reacting 7 parts of crude sulfochloroacetic acid with 7.5 parts of para-toluene-sulfochloride in 60 parts by volume of pyridine at 35° C.–40° C., while passing carbon dioxide through the mixture, until a clear solution is obtained and a test-sample is clearly soluble in dilute sodium carbonate solution. After about 4 hours the reaction is complete and the product is then worked up as described in Example 1. The sodium salt is obtained in the form of a grey, water-soluble powder. After the addition of dilute alkalies to the aqueous solution of the ester salt and in the presence of an oxidizing agent the insoluble parent vat dyestuff separates again after a short time.

Example 8

When proceeding as described in Example 1, but using the dyestuff obtained by melting with caustic potash the benzo - 1 - (alpha - anthraquinonyl)-amino-benzanthrone, there is obtained, after working up, the sodium salt of the corresponding leuco-sulfochloro-acetic ester in the form of a dark brown powder. From the aqueous solution of this compound the olive-green parent vat dyestuff separates after a short time on addition of dilute alkalies and in the presence of an oxidizing agent. The ester salt corresponds to the following formula:

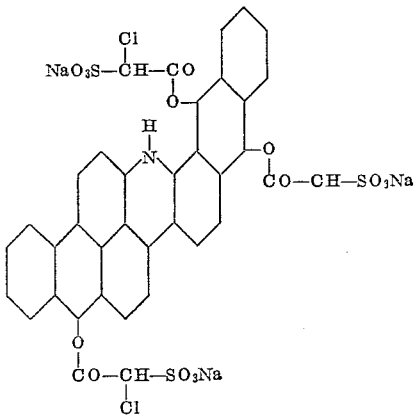

In a manner analogous to that described in the preceding examples the vat dyestuffs corresponding to the following formulae can also be transformed into the corresponding leuco sulfochloro-acetic esters which can readily be reconverted into the parent vat dyestuffs by means of alkalies in the presence of an oxidizing agent:

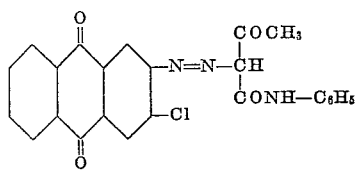

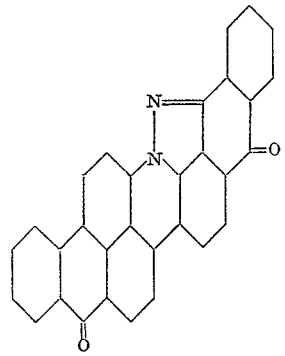

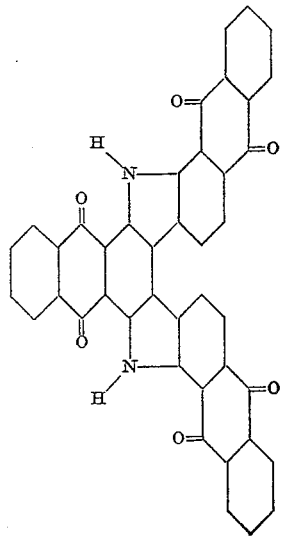

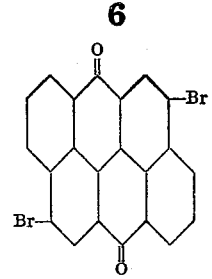

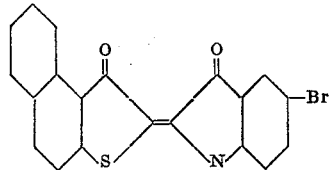

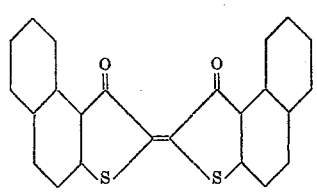

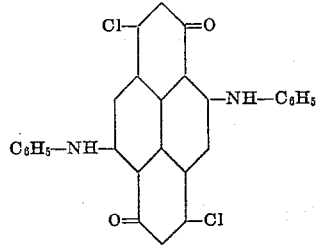

We claim:
1. The sulfochloro-acetic ester salts of leuco vat dyestuffs corresponding to the following general formula:

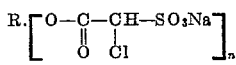

wherein R represents the radical of a vat dyestuff selected from the group consisting of indigoid and thioindigoid dyestuffs, dibenzanthrones, dibenzo-pyrene-quinones and benzanthrone-aminoanthraquinones, and $n$ means a number which is at least 2.

2. The sulfochloro-acetic ester salts of the leuco vat dyestuff corresponding to the following formula:

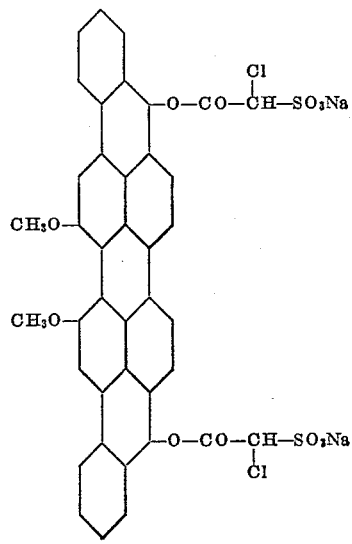

3. The sulfochloro-acetic ester salts of the leuco vat dyestuff corresponding to the following formula:

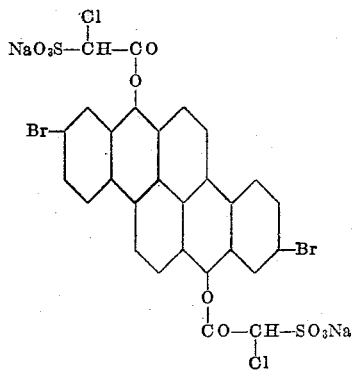

4. The sulfochloro-acetic ester salts of the leuco vat dyestuff corresponding to the following formula:

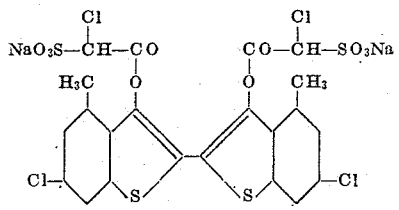

5. The sulfochloro-acetic ester salts of the leuco vat dyestuff corresponding to the following formula:

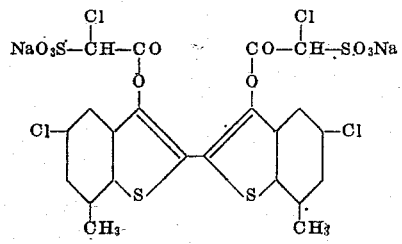

6. The sulfochloro-acetic ester salts of the leuco vat dyestuff corresponding to the following formula:

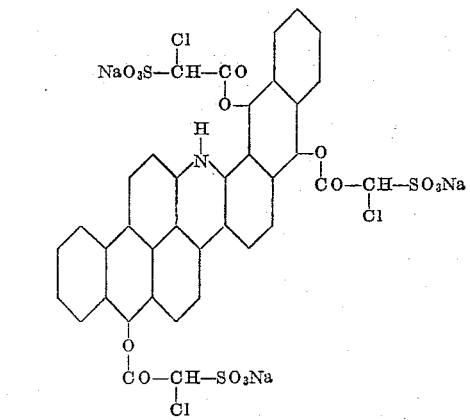

References Cited in the file of this patent
FOREIGN PATENTS
279,170    Switzerland _____ Feb. 16, 1952